(12) United States Patent
Naganuma

(10) Patent No.: US 7,396,169 B2
(45) Date of Patent: Jul. 8, 2008

(54) LIGHT QUANTITY ADJUSTING DEVICE AND PHOTOGRAPHING DEVICE HAVING THE SAME

(75) Inventor: Hiroaki Naganuma, Kofu (JP)

(73) Assignee: Nisca Corporation, Minamikoma-Gun, Yamanashi-Ken (JP)

( * ) Notice: Subject to any disclaimer, the term of this patent is extended or adjusted under 35 U.S.C. 154(b) by 630 days.

(21) Appl. No.: 11/159,335

(22) Filed: Jun. 23, 2005

(65) Prior Publication Data

US 2006/0008270 A1    Jan. 12, 2006

(30) Foreign Application Priority Data

Jul. 6, 2004    (JP)    ............... 2004-199261

(51) Int. Cl.
*G03B 9/08* (2006.01)
*G02F 1/00* (2006.01)

(52) U.S. Cl. ...................... 396/469; 396/457
(58) Field of Classification Search ............... 396/449, 396/452, 457, 458, 459, 460, 463, 469, 471, 396/493, 494, 495, 505, 506; 348/363
See application file for complete search history.

(56) References Cited

U.S. PATENT DOCUMENTS

2002/0034390 A1 *   3/2002   Naganuma ............... 396/452

FOREIGN PATENT DOCUMENTS

JP    2002-049076    2/2002
JP    2002-272082    9/2002

* cited by examiner

*Primary Examiner*—Rodney E Fuller
(74) *Attorney, Agent, or Firm*—Manabu Kanesaka

(57) ABSTRACT

A light quantity adjusting device includes a ring-shaped base plate having an exposure aperture at a center thereof, a first light quantity adjusting blade arranged in the exposure aperture, a first drive device for opening/closing the first light quantity adjusting blade, a second light quantity adjusting blade arranged in the exposure aperture, and a second drive device for opening/closing the second light quantity adjusting blade. The first drive device includes a magnet rotor and an exciting coil formed in a ring shape, and a guiding member for inducing a magnetic field to a position facing a magnetic pole formed on a circumference side of the magnet rotor. The second drive device includes a magnet rotor, an exciting coil, and a guiding member for guiding a magnetic field to a position facing a magnetic pole formed on a circumference side of the magnet rotor.

9 Claims, 10 Drawing Sheets

LIGHT QUANTITY ADJUSTING DEVICE AND PHOTOGRAPHING DEVICE HAVING THE SAME

BACKGROUND OF THE INVENTION AND RELATED ART STATEMENT

The present invention relates to a light quantity adjusting device, which is assembled in a photographing device such as a digital camera and a mobile telephone with a camera for adjusting quantity of photographic light through a shutter blade or iris blades, and relates to a photographic device having the light quantity adjusting device.

Generally, in a light quantity adjusting device, a base plate (or a main plate) having an aperture is arranged in a photographic optical path leading from an object to an image lens, and a shutter blade(s) and iris blades are individually rotatably or slidably supported on the base plate and are opened/closed by individual drive motors attached to the base plate.

In a light quantity adjusting device disclosed in Patent Publication 1 (Japanese Patent Publication (Kokai) No. 10-221740), a shutter blade and iris blades are rotatably supported at their base end portions through pins on a base plate having an optical aperture at its center, so that their leading ends face the optical pass aperture. In the light quantity adjusting device in Patent Publication 1, the shutter blade is formed of two blade members to be turned in the opposite directions from each other, and the iris blades are arranged such that a blade member for closing the aperture to a large area and a blade member for closing the aperture to a small area are arranged to face the aperture selectively.

As shown in FIG. 8, there is disclosed a structure, in which a shutter drive unit (or a moving magnet) X4 for opening/closing a pair of shutter blades X3; a first iris drive unit (or a moving magnet) X6 for moving a first iris blade X5 having a smaller aperture than an exposure aperture X2 formed at the center of a main plate X1 suitably to and from the exposure aperture X2; and a second iris drive unit (or a moving magnet) X8 for moving a second iris blade X7 having a far smaller aperture than the exposure aperture X2 suitably to and from the exposure aperture X2 are arranged at a substantially equal spacing around the exposure aperture X2.

The light quantity adjusting device is formed to arrange the plural common drive units X4, X6 and X8 at the common distance around the exposure aperture X2 of the main plate X1. Accordingly, it is necessary to provide a space matching to a diameter of the drive units around the exposure aperture X2. Due to the arrangement of the drive units X4, X6 and X8 at the circumferential edge of the aperture of the main plate, it is difficult to keep the arranging spaces for the drive units X4, X6 and X8 in a case of a lens barrel which moves back and force like a zoom lens. At an especially high shutter speed, the drive unit X4 for opening/closing the shutter blade X3 has to be formed as a unit having a high output torque, thereby increasing a size of the device large.

In Patent Publication 2 (Japanese Patent Publication (Kokai) No. 2002-049076), a shutter device is disclosed as a drive device for opening/closing a pair of shutter blades Y2 and Y3, which are arranged between a holder plate Y1 and a main plate Y4, as shown in FIG. 9. The shutter device includes: a generally cylindrical magnet rotor Y5 having a drive arm protruding from a side portion and magnetically divided into N and S poles; an auxiliary stator Y6 inserted into a hollow portion of the rotor Y5; a stator Y8 made of a soft magnetic material and having a column-shaped inner cylinder for fitting the auxiliary stator Y6 therein and an outer magnetic pole 3a having a tooth-shaped leading end portion; and a conduction coil Y7.

The stator Y8 and the auxiliary stator Y6 are magnetized by the conduction coil Y7 thereby to drive the intervening magnet rotor Y5 magnetically rotationally. Therefore, the shutter device has a higher magnetic efficiency than that of the structure in Patent Publication 1, and has a merit that the drive device can be small-sized for the higher magnetic efficiency.

In Patent Publication 3 (Japanese Patent Publication (Kokai) No. 2002-272082), there is disclosed a structure, in which there are arranged sequentially in the direction of an optical axis a blade holder Z1, blades Z2, a main plate Z3, a magnet rotor Z4 having a hollow cylinder shape, a magnet holder Z5, a cylindrical coil Z6, and a stator Z7 having an outer cylinder having a leading end portion extending in the axial direction and formed into a plurality of comb teeth. The light quantity adjusting device is ring-shaped to pass an optical path through the central portion of the drive device, so that it can be easily built in the cylindrical lens barrel of a zoom lens.

As a size of the device has been reduced as in a recent mobile telephone having a built-in camera, the light quantity adjusting device has a small base plate and small blades to be assembled into the base plate. The small-sized drive device has a low output torque, thereby making it difficult to drive the blades at a high speed. Therefore, the structure in Patent Publication 1 has a limit in the size reduction, and the structure in Patent Publication 3 can make the device small and flattened.

In the Patent Publications, the blade is structured by the shutter blade or the iris blade. Accordingly, when both the shutter blade and the iris blade are assembled in a common base plate and driven by an individual drive motor, in the structure in Patent Publication 3, it is necessary to arrange two ring-shaped magnets around the optical path aperture. Further, in Patent Publication 3, the N/S magnetic poles are alternately arranged on the circumferential side of the ring-shaped magnet rotors and the yokes of the inducing iron members are arranged to face on the rotor circumferential sides. Accordingly, it is difficult to magnetically shield the magnetic field generated in the coil, and the magnetic fields of the magnets and the inducing iron members may exert magnetic influences therearound.

In view of the problems described above, an object of the present invention is to provide a small-sized compact light quantity adjusting device, in which shutter blades for shutting the photographing light quantity, an iris blade for adjusting the light quantity, and a drive device for opening/closing the blades are assembled in a common base plate.

Another object of the invention is to provide a light quantity adjusting device, in which blade members are prevented from any operation irregularity due to mutual interference among the magnetic fields of magnets, coils, and the like, when a plurality of drive units is assembled in a base plate, and a photographing device using the light quantity adjusting device.

Further objects and advantages of the invention will be apparent from the following description of the invention.

SUMMARY OF THE INVENTION

In order to achieve the above-specified objects, according to a first aspect of the invention, a light quantity adjusting device comprises: a ring-shaped base plate having an exposure aperture at a center thereof; a first light quantity adjusting blade arranged in the exposure aperture; a first drive device for opening/closing the first light quantity adjusting blade; a second light quantity adjusting blade arranged in the exposure aperture; and a second drive device for opening/closing the second light quantity adjusting blade. The base plate is formed of a pair of, a main plate and a holder plate with a disc shape to retain the first and second blade members.

The first drive device includes: a magnet rotor and an exciting coil formed in a ring shape, and a guiding member for guiding or inducing a magnetic field generated in the exciting coil to a position facing a magnetic pole formed on a circumference side of the magnet rotor. The second drive device includes: a magnet rotor; an exciting coil; and a guiding member for inducing a magnetic field generated in the exciting coil to a position facing a magnetic pole formed on a circumference side of the magnet rotor. The magnet rotor and the exciting coil of the first drive device are vertically arranged in stacked states on an inner circumferential edge of the exposure aperture of the base plate. The magnet rotor and the exciting coil of the second drive device are vertically arranged in stacked states on a portion of an outer circumferential edge of the exposure aperture of the base plate. The first and second magnet rotors are individually rotatably supported. With this structure, the first and second drive device can be arranged with a small spare space on a common base plate (the main plate).

According to a second aspect of the invention, a light quantity adjusting device comprises: a ring-shaped base plate having an exposure aperture at a center thereof; a first light quantity adjusting blade arranged in the exposure aperture; a first drive device for opening/closing the first light quantity adjusting blade; a second light quantity adjusting blade arranged in the exposure aperture; and a second drive device for opening/closing the second light quantity adjusting blade.

The first drive device includes: a ring-shaped magnet rotor arranged on an inner circumferential edge of the exposure aperture; and an exciting coil wound in a ring shape with a diameter substantially equal to that of the magnet rotor. The second drive device includes: a magnet rotor arranged on a portion of an outer circumferential edge of the exposure aperture; and an exciting coil wound in a ring shape with a diameter substantially equal to that of the magnet rotor. The first drive device and the second drive device are individually arranged on the base plate in stacked states, one in an order of the magnet rotor and the exciting coil and the other in an order of the exciting coil and the magnet rotor. As a result, it is possible to reduce a size of the device similar to the first aspect of the invention. At the same time, the first and second magnet rotors are prevented from magnetically interfering each other, even if they are arranged adjacent to each other on the common base plate.

In the second aspect, the first drive device and/or the second drive device may include a plurality of different magnetic poles formed alternately on a circumferential side of the magnet rotor, and the exciting coil includes a guiding member for inducing the magnetic field to the position facing the magnetic poles of the magnet rotor. As a result, it is possible to make the device flat and thin as a whole.

In the first and second aspects, the first light quantity adjusting blade may be formed of shutter blades for opening/closing the exposure aperture, and the second light quantity adjusting blade may be formed of an iris blade for adjusting the diameter of the exposure aperture. An output torque of the first drive device is set higher than that of the second drive device. As a result, the shutter blades required to turn at a high speed are driven by the magnetic rotor and the exciting coil of the first drive device having a large diameter. The second drive device for driving the iris blade permitted for slow actions can be made small. Thus, the base plate for mounting the drive devices need not be large.

DETAILED DESCRIPTION OF PREFERRED EMBODIMENTS

Hereunder, embodiments of the present invention will be described in detail with reference to the accompanying drawings.

Figure 1:
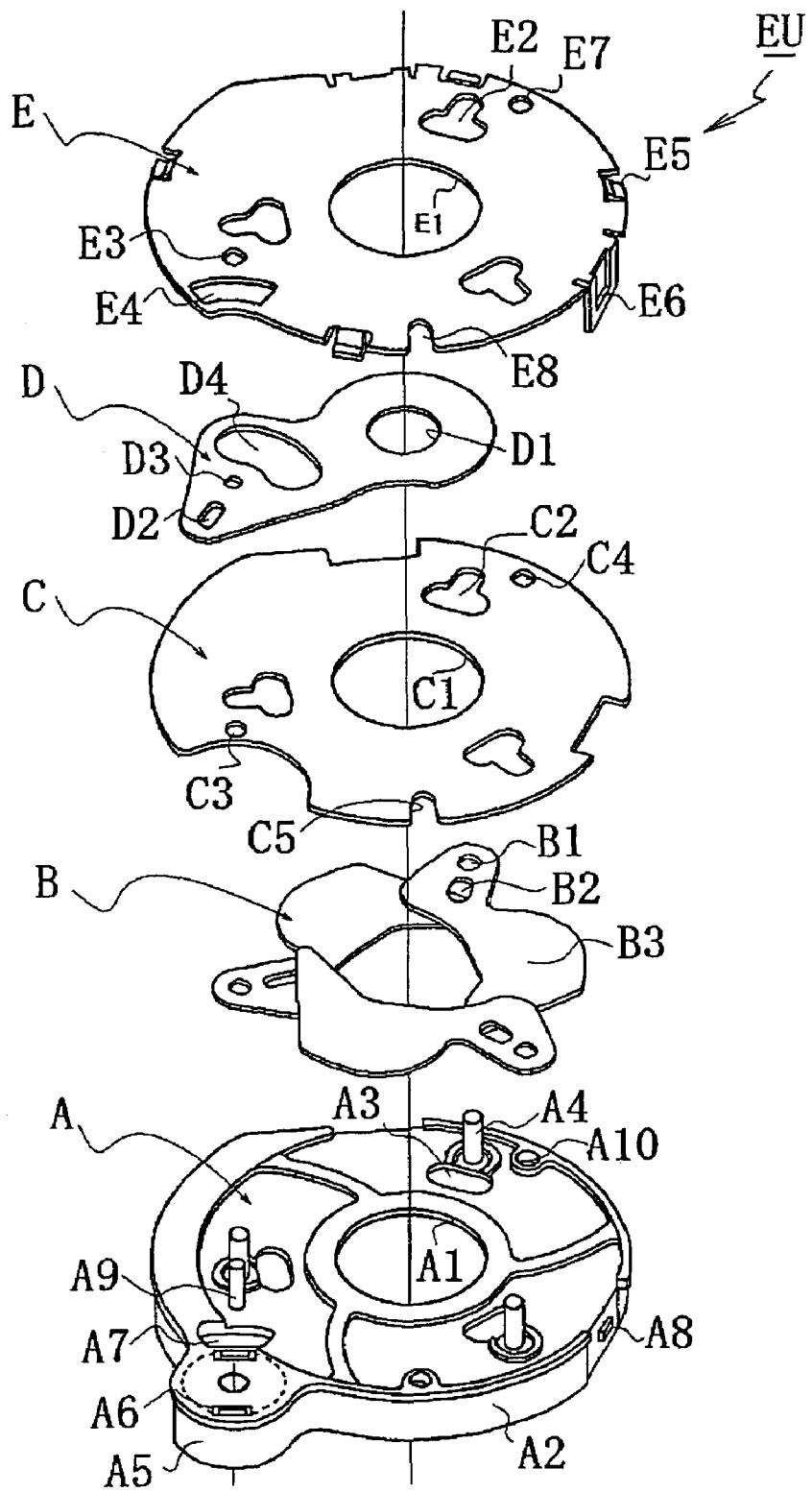
FIG. 1 is an exploded perspective view of a light quantity adjusting unit of a light quantity adjusting device having an iris unit and a shutter unit according to an embodiment of the present invention.
Figure 2:
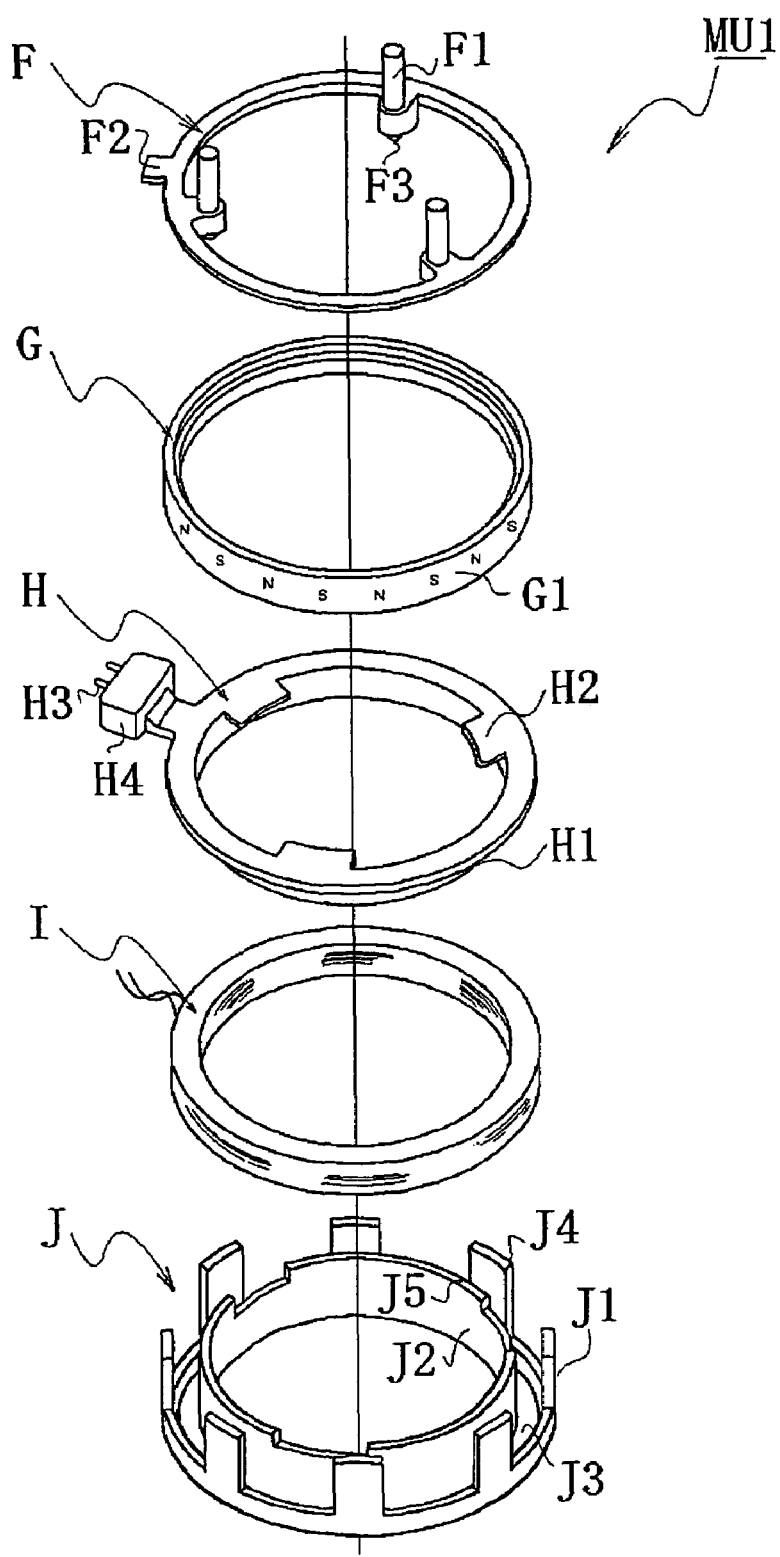
FIG. 2 is an exploded perspective view of a first drive device attached to the light quantity adjusting device for driving the shutter unit of the light quantity adjusting device shown in FIG. 1.
Figure 3:
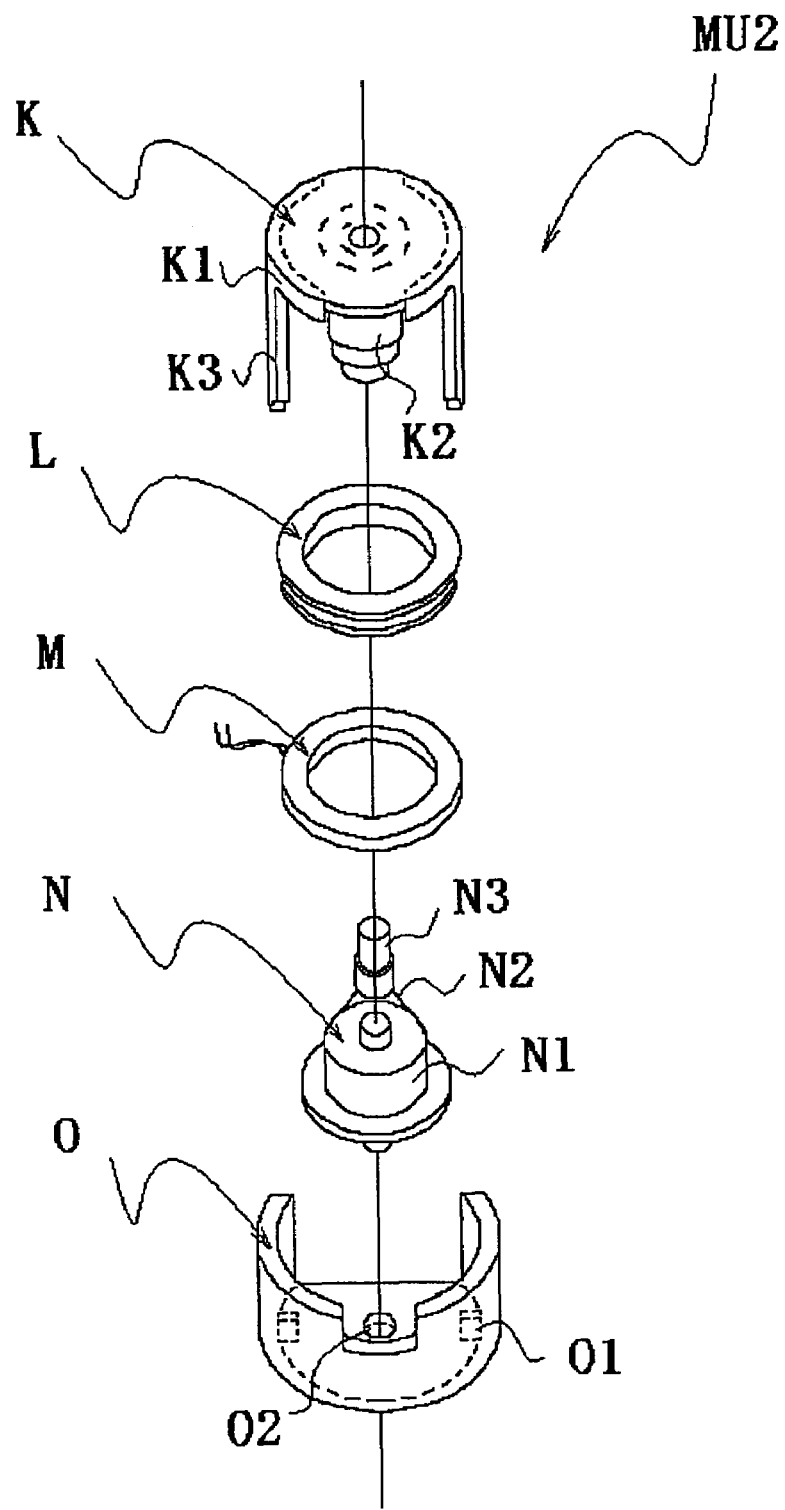
FIG. 3 is an exploded perspective view of a second drive device attached to the light quantity adjusting device for driving the iris unit of the light quantity adjusting device shown in FIG. 1.

FIG. 1 is an exploded perspective view showing a structure of a base plate and a light quantity adjusting blade of a light quantity adjusting device according to an embodiment of the invention. FIG. 2 is an exploded view showing a structure of a first drive device to be attached to the base plate. FIG. 3 is an exploded view showing a structure of a second drive device.

A light quantity adjusting device EU to be arranged in an optical path of a camera device or the like includes: a base plate; first light quantity adjusting blades B and a second light quantity adjusting blade D arranged in an exposure aperture A1 formed in the base plate; and a first drive device MU1 and a second drive device MU2 attached to the base plate for opening/closing the first light quantity adjusting blades B and the second light quantity adjusting blade D, respectively.

These components are consecutively described in the following. The base plate to be assembled into the lens barrel of the camera device is formed by integrating a main plate A and a holder plate E with an intermediate plate C for partitioning the first light quantity adjusting blades B and the second light quantity adjusting blade D to be assembled into that main plate A. The base plate (the main plate A, the intermediate plate C, and the holder plate E) has, at its center, an exposure aperture A1 in the main plate A, an exposure aperture C1 in the intermediate plate C, and an exposure aperture E1 in the holder plate E, respectively, with a common diameter. The main plate A is molded of a synthetic resin and a device base frame strong enough for mounting a drive device (described later). The main plate A is formed in a flattened ring shape having the exposure aperture A1 at its center. Guide faces A11 for supporting the blades and support pins A4 for supporting the blades rotatably are molded of a resin integrally with a flattened face of the main plate A.

The guide faces A11 and support pins A4 are individually formed at three portions, so that the first light quantity adjusting blades B to be held by the guide faces A11 and the support pins A4 are formed of three blades. Slit holes A3 are formed near the individual support pins A4 as relief grooves, in which later-described transmission pins between the blades and the drive device are fitted. A flange A2 and a flange A5 connected to the flange A2 are molded of a resin on an outer circumferential edge integrally with the main plate A, so that the flange portion A2 is formed into a generally cylindrical shape and the flange A5 is formed to bulge partially from the flange portion A2. The first and second drive devices are assembled in the main plate A on a back side (a lower side in FIG. 1) of the guide faces A11.

The first light quantity adjusting blades B constitute a shutter or shutter blades formed of three blade members B3. The three blade members B3 are supported by fitting holes B1 formed in base end portions thereof in the support pins A4 of the main plate A, so that they can freely turn along the guide faces A11. The individual blade members B3 are arranged with their individual adjoining edge portions lying one on another, so that their leading end portions face the exposure aperture A1. The blade members B3 are supported to be rotatable between an open position, at which the exposure aperture A1 is fully opened, and a closed position, at which the exposure aperture A1 is fully closed. Reference characters B2 designate slots formed in the individual blade members B3 for engaging transmission pins (described later) of the first drive device MU1.

After the shutter blades B are assembled into the main plate A, and the intermediate plate C is attached to the main plate A. Reference character A10 designates a screw hole formed in the main plate A, and reference characters C4 and C5 designate screw holes formed in the intermediate plate C, through which the holder plate E and the intermediate plate C are attached to the main plate A with screws. The intermediate plate C is made of a thin sheet of metal or a resin, and is provided as a partition for preventing the shutter blades B and the iris blade D (described later) from interfering each other. In the intermediate plate C, the exposure aperture C1 is formed, and the second light quantity adjusting blade D facing the exposure aperture C1 is attached in the following manner. The second light quantity adjusting blade D constitutes an iris blade, and is arranged by one or a plurality in the aperture A1 so as to adjust the diameter of the exposure aperture A1 (C1) to a large or small value.

In the embodiment, the iris blade is a single blade and made of a flattened sheet member (of a metal or resin film) having an iris aperture D1 smaller than the exposure aperture A1. In the base end portion of the iris blade D, there is formed an engaging hole D3, which engages a support pin A9 formed (or embedded) on the main plate A. The iris blade D is supported to move between an iris position, at which it advances on the intermediate plate C into the exposure aperture C1, and a retracted position, in which it is retracted from the aperture C1. The engaging hole D3 is supported on the support pin A9 of the main plate A.

In the intermediate plate C, there is formed a relief plate C3, through which the support pin A9 extends. The intermediate plate C is made of a soft metal or synthetic resin sheet to be light and easy to work. Accordingly, the iris blade D is supported by the main plate A through the support pin A9, not by the intermediate plate C. In the iris blade D, there are formed a slit D2 for engaging a transmission lever of the second drive device (described later), and a relief hole D4 for a leading end of a transmission pin or pins F1 according to the number of the shutter blades B.

The main plate A, the shutter blades B, the intermediate plate C, and the iris blade D are overlapped and assembled in the recited order, and the holder plate E facing the main plate A is attached over the iris blade D. The holder plate E is formed of a thin sheet of metal or a resin and is provided with the exposure aperture E1, relief holes E2 for the support pins A4 of the main plate A, a relief hole E3 for the support pin A9, and a relief hole E4 for the transmission lever of the second drive device (described later). The holder plate E is provided, at suitable portions (i.e., three portions, as shown) of its peripheral edge, with retained pawls E5, which are retained in retaining holes (not-shown) formed in the flange portion A2 of the main plate A. These fitting relations are removably performed by the elasticity of the retained pawls E5.

The holder plate E is provided, at several portions of its peripheral edge portion, e.g., at two portions, with bent members E6, which are fitted on protrusions A8 formed on the side wall (i.e., the flange portion A2) of the main plate A. The bent members E6 and the protrusions A8 of the main plate A are firmly fixed simultaneously as the main plate A and the holder plate E are positioned. The holder plate E, the intermediate plate C, and the main plate A are integrally fixed by a screw hole E7 and the screw holes C4 and A10. Therefore, the shutter blades B and the iris blade D are individually rotatably supported between the main plate A and the holder plate E, so that the blades are partitioned by the intermediate plate C without interference.

The drive devices for opening/closing the first and second light quantity adjusting blades B and D will be explained. To the main plate A on the back face (as located on the lower side of FIG. 1), on which the shutter blades B are assembled, there are attached the first and second drive devices MU1 and MU2. The first drive device MU1 opens/closes the first light quantity adjusting blades (the shutter blades B), and the second drive device MU2 opens/closes the second light quantity adjusting blade (the iris blade D). The first drive device MU1 is formed of a rotor set and a stator set of a flattened ring shape having spaces at their centers. The rotor set is formed, as shown in FIG. 2, by integrating a magnet G formed in a ring shape and a drive ring F having the transmission pins F1. The stator set is formed by integrating a coil bobbin H formed in a ring shape, a coil I wound on the coil bobbin H, and a yoke J having magnetic guiding members J4 (described later).

The rotor set and stator set are formed into ring shapes having hollow portions at their centers, and the hollow portions have a diameter larger than that of the exposure aperture A1 of the main plate A. The drive ring F is molded of a resin integrally with the transmission pins F1 for engaging the slots B2 of the shutter blades B, in a number according to the blade number. The ring-shaped magnet G is made of a plastic magnet, and is fitted on and integrated with the drive ring F. The magnet G is injection-molded by mixing magnetic powders of rare earth elements of Na—Fe—B and a binder of a thermoplastic resin such as polyamide. The plastic magnet is used so that the ring shape can be easily formed and may be formed by a thermally binding treatment.

The ring-shaped magnet has a plurality of N-S poles alternately magnetized on its outer circumferential side, such that the N poles and the S poles are formed by dividing the outer circumference into sixteen portions. The ring-shaped magnet G thus magnetized is fitted on and integrated with the drive ring F by means of an adhesive. The two members are separately formed and then integrated, so that their working is facilitated and the two members can be integrally molded of a plastic material.

The stator set is formed of the ring-shaped coil bobbin H, the coil I wound on the coil bobbin H, and the yoke J. The bobbin H has an external diameter substantially equal to that of the magnet rotor (F and G), and a flange Hi winding the coil and a terminal unit H4 having terminal pins H3 as lead wires of the coil I are integrally formed around the bobbin H. The bobbin H is molded of a resin, and is provided on its end face with a support face H2 for supporting the magnet rotor rotatably. The ring-shaped magnet rotor is supported rotatably between the main plate A and the coil bobbin H with a supporting structure (described later). The exciting coil I is wound on the flange H1 of the bobbin H in a ring shape in the circumferential direction, and the number of turns is set according to a wire type and an output torque. The exciting coil I is wound so as to generate an output torque higher than that of an exciting coil M of the later-described second drive device MU2.

The coil I and the bobbin H are integrated with each other by winding the coil, so that they are housed in the yoke J to constitute the stator set. The yoke J is formed of a cylinder having an inner cylinder J2 and an outer cylinder J1 having a C-shaped section, and a bottom portion J3. The yoke J is made of a soft magnetic material, the outer cylinder J1 constitutes outer guiding members J4 to confront the outer circumferential side of the magnet rotor, and the inner cylinder J2 constitutes inner guiding members J5 to confront the inner circumferential side of the magnet rotor. Accordingly, the magnetic field induced in the coil I housed in the bottom portion J3 is propagated to the outer cylinder J1 and the inner cylinder J2.

The inner guiding members J5 and outer guiding members J4 induce the magnetic field induced in the coil I to positions confronting the magnetic poles of the ring-shaped magnet G thereby to apply the rotating force to the magnet rotor. Therefore, the N-S magnetic poles are alternately magnetized by 16 poles on the circumferential sides of the magnet rotors F and G (as will be designated by G). Accordingly, the outer guiding members J4 are disposed in plurality in a comb-tooth shape to confront the magnetic poles of the magnet rotor G, and the inner guiding members J5 forming the magnetic circuits with the outer guiding members J4 are formed in the cylindrical shape.

The number of the outer guiding members J4 is equal to one half (eight in the embodiment) of the magnetization division number n of the magnet rotor G arranged at circumferential equidistant positions of $(360\times2)/n$ degrees (45 degrees in the embodiment). The number of the outer guiding members J4 need not always be one half of the number n of the magnetic poles of the magnet rotor G, and may be reduced by one or more, for example. In this modification, the output torque drops, but the reduced space can be utilized for arranging other parts. In a case that the number of the outer guiding members J4 is decreased, the remaining outer guiding member or members J4 have to be arranged in the relative positions of $(360\times2)/n$ in the cylindrical direction.

The rotor set and the stator set thus individually integrated are assembled into the main plate A in the following manner. An annular flange A12 (as referred to FIG. 5), as concentric to the exposure aperture A1, is molded of a resin integrally with a back face side of a flat face (on the side of the guide face A11), to which the shutter blades B are attached. The yoke J to constitute the stator set is fitted and fixed on the annular flange A12. The flange A12 and the yoke J are fixed by means of an adhesive or screws (not shown).

The coil bobbin H having the coil I wound thereon is housed and supported in the yoke J and is fixed on the bottom portion J3 by means of an adhesive or the like. The magnet rotor G integrated with the drive ring F is provided at the end portions of the transmission pins F1 with protrusions F3, which are slidably supported at their leading ends on the support face H2 (or the rotor guide face) formed at the flat face of the coil bobbin H. Therefore, the magnet rotor G is rotatably supported such that the protrusions F3 formed thereon are borne on the support face H2 (or the rotor guide face) formed on the stator.

The magnet rotor G is supported on the side of the drive ring F by annular ribs A13 formed on the main plate A. Therefore, the magnet rotor G is borne and supported between the main plate A and the stator and is rotatably assembled. In order to reduce rattling of the magnet rotor G, a V-groove may be formed in the drive ring F to engage the annular ribs A13 or in the support face H2 of the coil bobbin H to be engaged by the protrusions F3.

The first drive device MU1 thus assembled is arranged on the main plate A into a stacked state in the order of the magnet rotor G and the coil I. In the first drive device MU1 attached to the main plate A, the transmission pins F1 embedded in the drive ring F are fitted in the slots B2 of the shutter members B3 through the slit holes A3 of the main plate A. Therefore, the rotation of the magnet rotor G is transmitted through the transmission pins F1 to the individual blade members, so that the shutter blades B3 are turned on the support pins A4 thereby to open/close the exposure aperture A1.

The second drive device MU2 includes: a magnet rotor N having a cylindrical or column-shaped magnet N1 and a transmission arm N2 integrated with each other; and a stator having a coil M and a guiding member integrated with each other for inducing the magnetic field generated in the coil M. The magnet rotor N is a plastic magnet molded of a resin by integrating the transmission arm N2, an engaging pin N3 at the leading end of the arm, and a pivot N4. The magnet N1 has its column-shaped circumferential side magnetized into two N-S poles. The stator includes a guiding member K, a ring-shaped coil bobbin L, and a coil M wound on the bobbin. The guiding member K is formed of a soft magnetic material into a cylindrical shape having a bottom portion for housing the coil bobbin L, a pivot-shaped inner guiding member K2 at its center portion, and comb-tooth shaped outer guiding members K3 at its outer circumference.

The coil bobbin L is formed of a resin by winding the coil M on its side, and has terminals formed integrally for connecting coil wires (not shown). The coil bobbin L thus wound with the coil is housed on the bottom portion of the guiding member K and is integrally fixed by means of an adhesive. The exciting coil M has a winding to have a lower output torque than that of the exciting coil I of the aforementioned first drive device MU1. The coil bobbin L wound with the coil has an external diameter substantially equal to that of the magnet N1 of the magnet rotor N, and is formed to stack the magnet rotor N and the coil M one on the other. Reference letter O designates a shielding yoke, which is formed of a soft magnetic material into a cup shape to cover the outer circumference of the magnet rotor N.

The coil bobbin L having the coil M wound thereon is housed in and integrated with the guiding member K by means of an adhesive. The magnetic field generated in the coil M is induced between the inner guiding member K2 and the outer guiding members K3. The magnet rotor N is provided, on its outer circumferential face, with two N-S poles, and is fitted at one side of its pivot N4 in the bearing hole formed in the inner guiding member K2, so that the magnetic poles face the outer guiding members K3 and the transmission arm N2 is positioned in a direction perpendicular to the outer guiding members K3. The other side (a lower side in FIG. 3) of the pivot N4 is fitted in a bearing hole O2 formed in the shield yoke O. The leading ends of the outer guiding members K3 are fitted and fixed in retaining holes 01 of the shield yoke O.

The second drive device MU2 thus integrated into the unit is fitted and fixed at the flange portion of the stator set on mounting hooks A6 provided at the main plate A, so that the second drive device MU2 freely released by the elastic deformations of the mounting hooks A6. In the magnet rotor N of the second drive device MU2 thus formed, the engaging pin N3 of the transmission arm N2 formed integrally is fitted through a relief groove A7 of the main plate A in the slit hole D2 formed in the iris blade D, thereby to turn the iris blade D on the support pin A9 by the rotation of the rotor.

Figure 4:
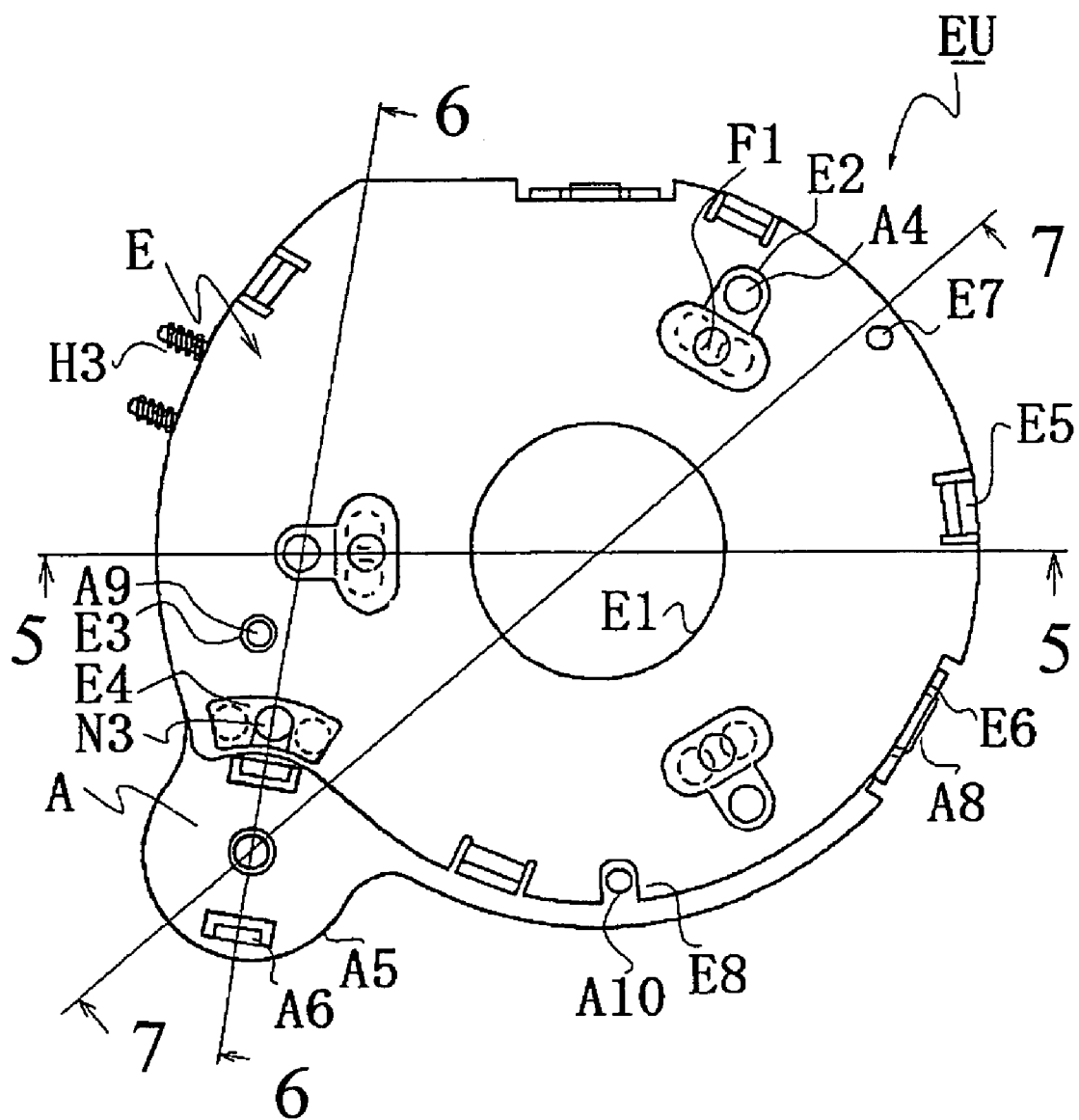
FIG. 4 is a top plan view of the light quantity adjusting device shown in FIG. 1.
Figure 5:
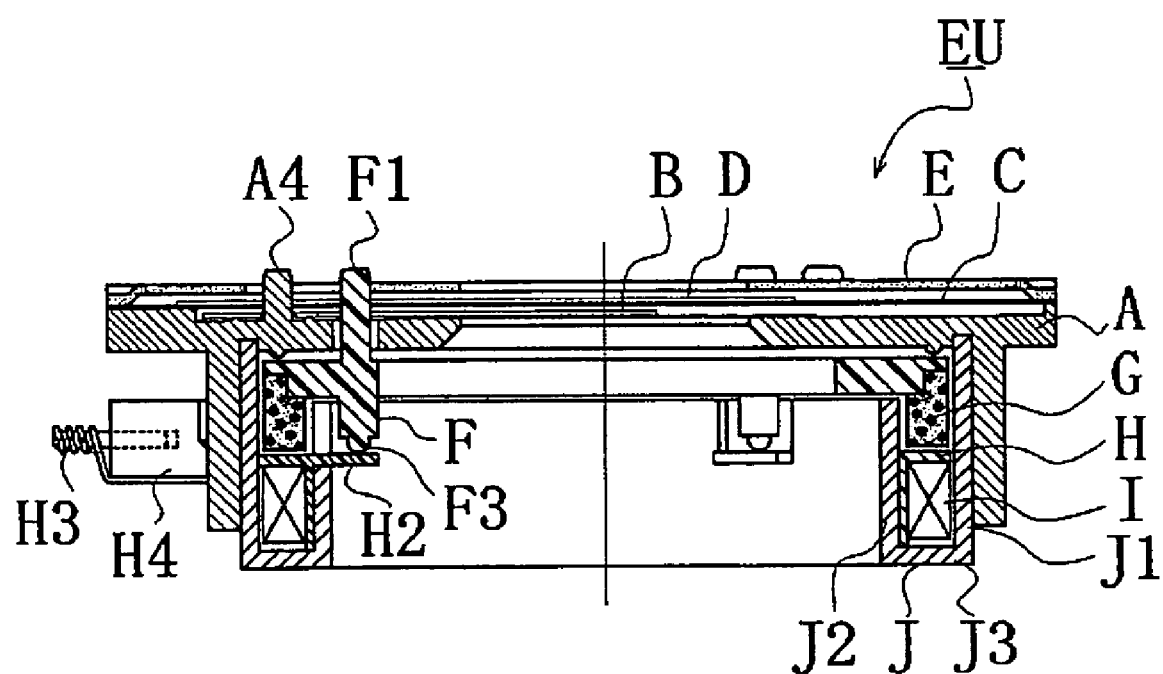
FIG. 5 is a sectional view taken along line 5-5 in FIG. 4.
Figure 6:
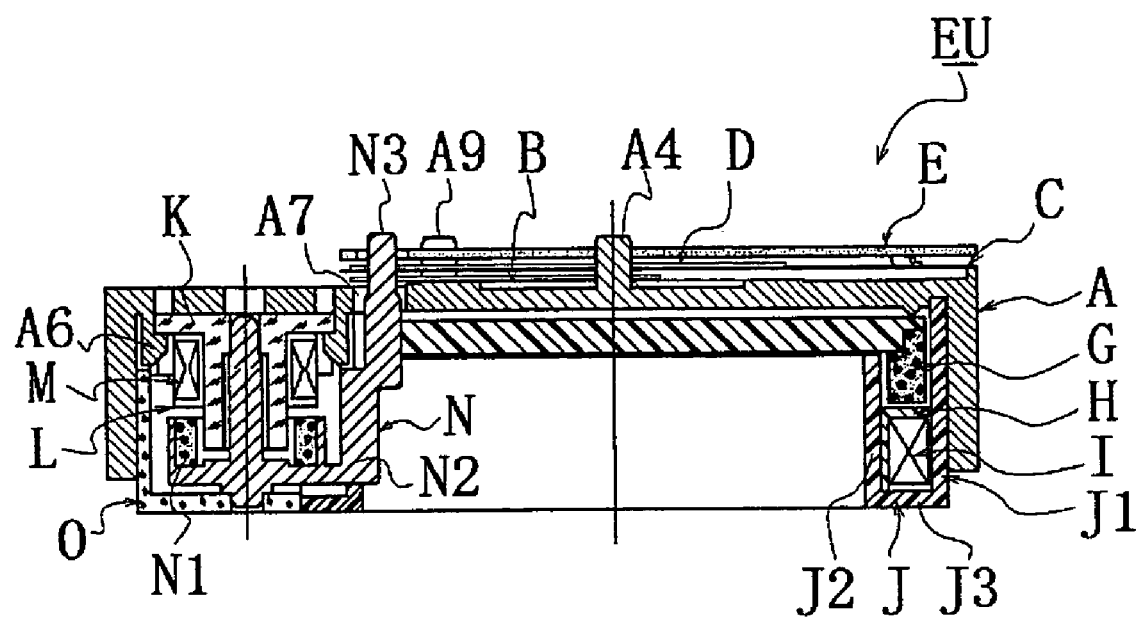
FIG. 6 is a sectional view taken along line 6-6 in FIG. 4.
Figure 7:
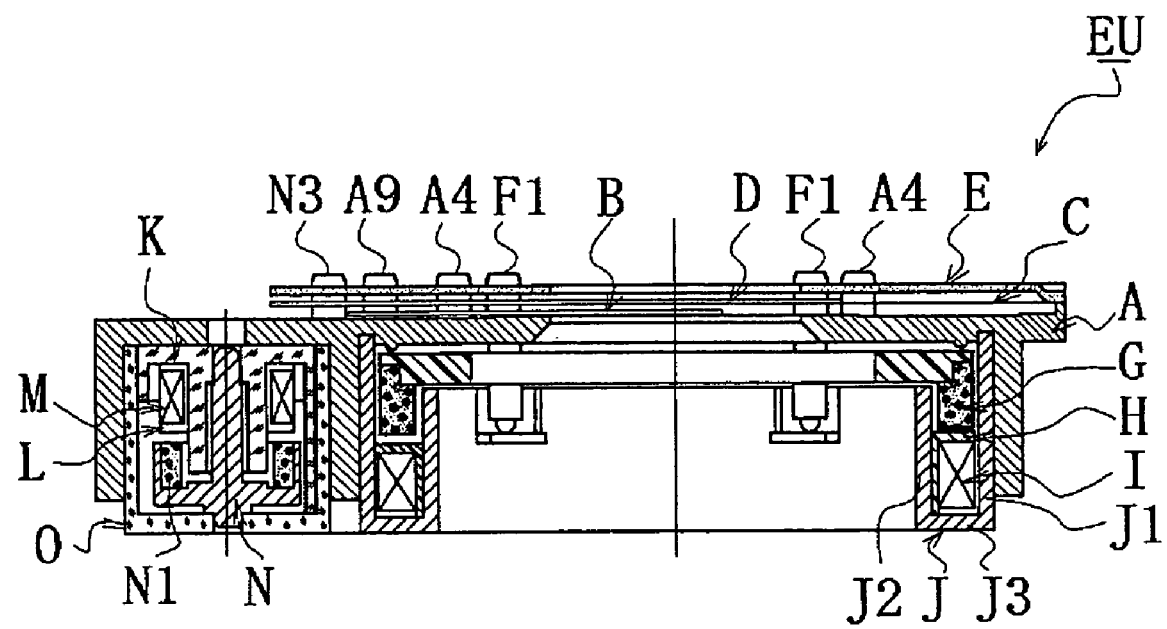
FIG. 7 is a sectional view taken along line 7-7 in FIG. 4.
Figure 8:
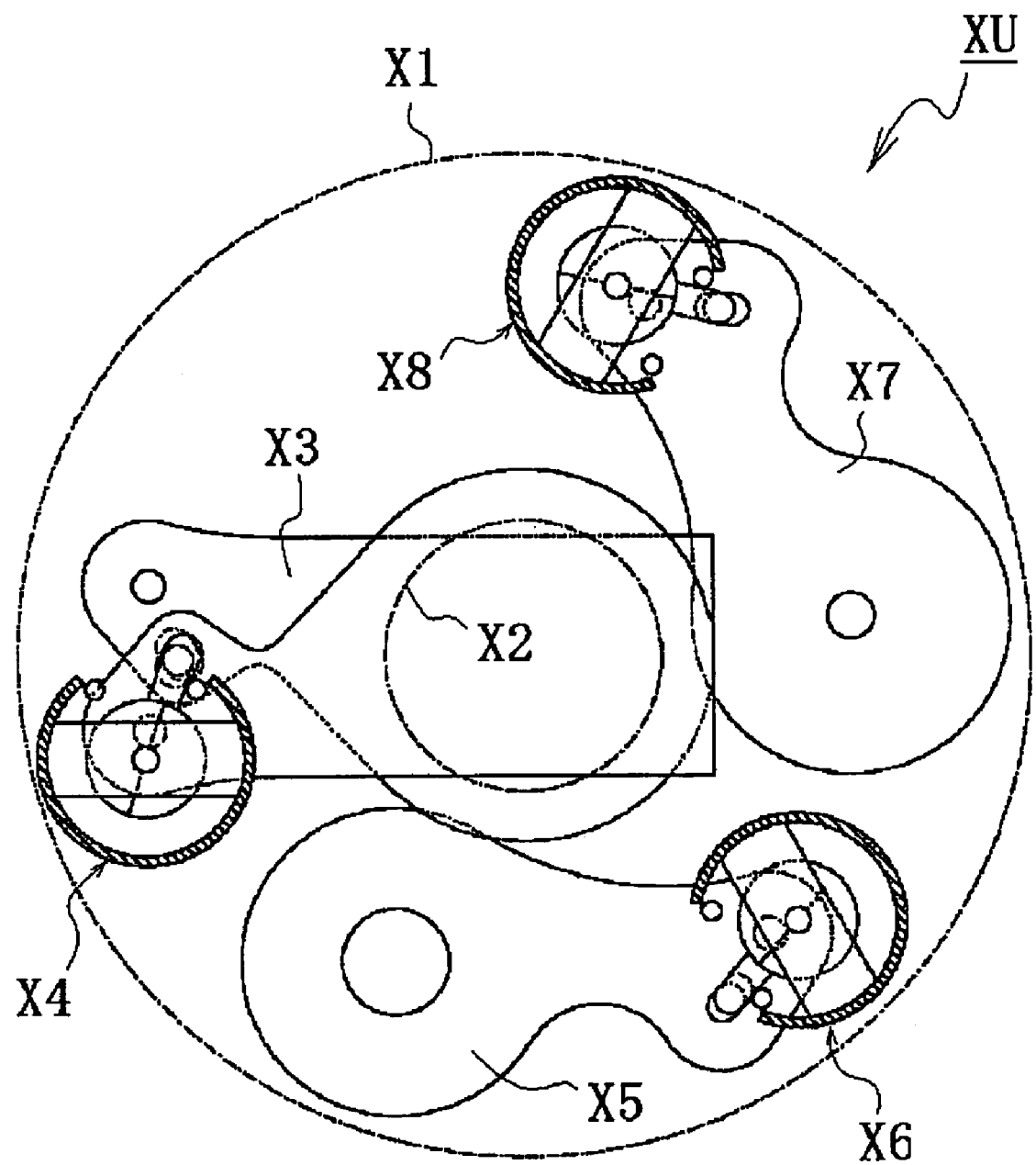
FIG. 8 shows a shutter device having a conventional iris unit.
Figure 9:
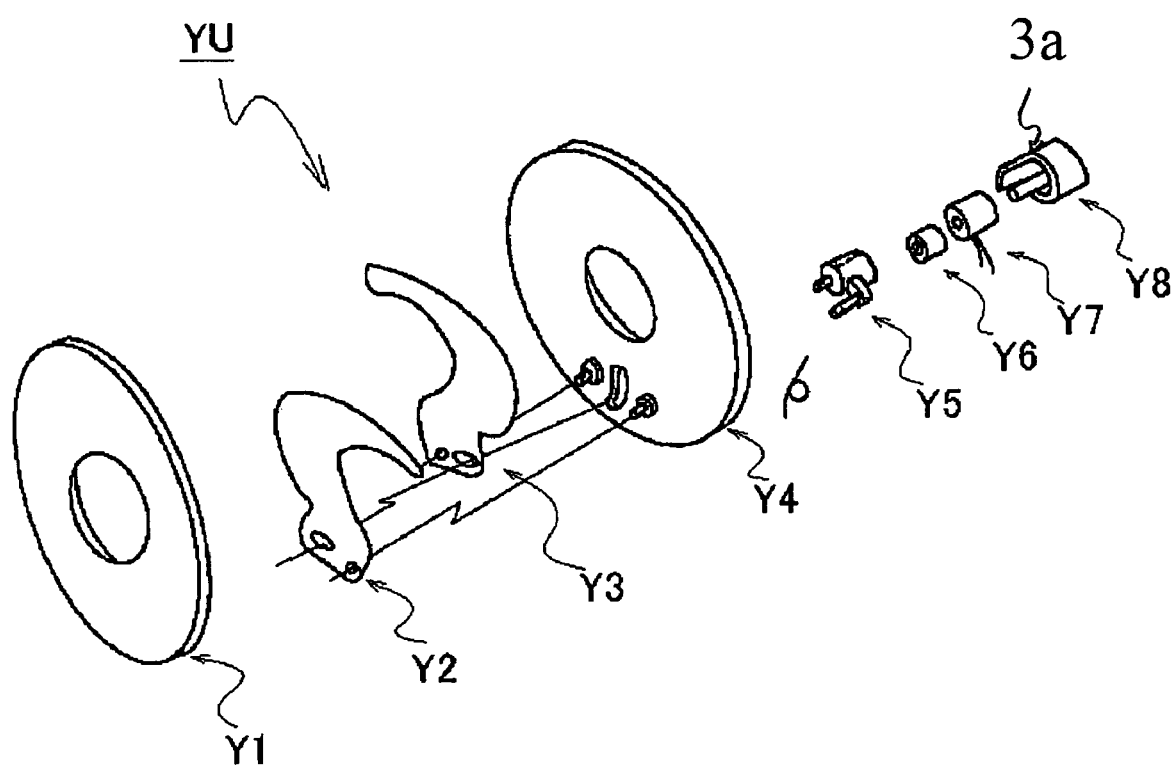
FIG. 9 shows a shutter device using a conventional drive device.
Figure 10:
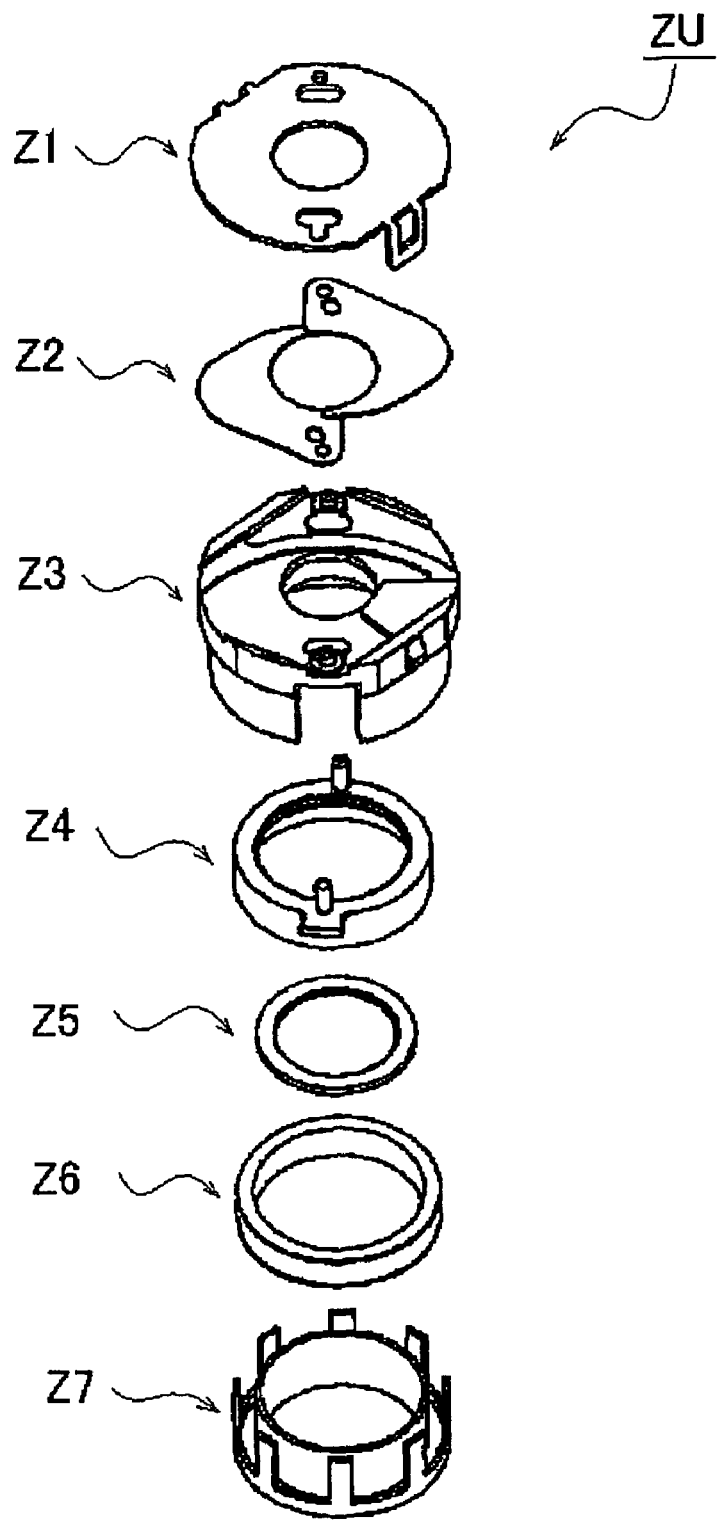
FIG. 10 shows a shutter device using another conventional drive device different from that shown in FIG. 9.

FIG. 4 to FIG. 7 show positional relations between the first and second drive devices M11 and MU2 and the base plate (the main plate and the holder plate). FIG. 4 is a top plan view of the light quantity adjusting device shown in FIG. 1. FIG. 5 is a sectional view taken along line 5-5 in FIG. 4. FIG. 6 is a sectional view taken along line 6-6 in FIG. 4. FIG. 7 is a sectional view taken along line 7-7 in FIG. 4. As shown in FIG. 5, the first drive device MU1 is attached to the annular flange A12 through the yoke J, so that the magnet rotor F may rotate on the same center as that of the exposure aperture A1 of the main plate A. The rotation of the magnet rotor N is transmitted to the individual blade members from the transmission pins F1 according to the number of the shutter blades B (the first light quantity adjusting blades).

The second drive device MU2 is attached to the flange A5 bulging from a portion of the disc-shaped main plate A, so that the transmission arm N2 of the magnet rotor N is positioned in the shown direction 6-6. Of the individual drive device thus attached, as shown in FIG. 7, the first drive device MU1 is arranged on the main plate A and stacked in the order of the magnet rotor F and the exciting coil I. The second drive device MU2 is arranged on the main plate A in the order of the exciting coil M and the magnet rotor N.

In the first and second drive device MU1 and MU2, the magnet rotors and the exciting coils are formed into the ring-shaped or column-shaped flattened shapes having substantially equal external diameters, so that the magnets and the coils are arranged in the stacked shapes. At this time, one of the first and second drive devices MU1 and MU2 has the magnet and coil arranged in the recited order with respect to the main plate A, whereas the other has the coil and magnet arranged in the recited order. When an electric current is fed to the coils to rotate the magnet rotors, therefore, the circumferential side having the magnetic poles of the magnet rotor is faced by the coil of the other drive device. As a result, the two drive devices arranged on the common main plate can attain stable drive rotations without any magnetic interference of their magnet rotors.

As described above, according to the invention, the drive devices for the first and second light quantity adjusting blades arranged in the exposure apertures include the ring-shaped magnet rotors, the exciting coils, and the magnetic yokes for guiding the magnetic fields of the exciting coils into the magnetic poles of the magnet rotors. The magnet rotor of the first drive device is arranged on the inner circumferential edge of the ring-shaped base plate whereas the magnet rotor of the second drive device is arranged in the portion of the outer circumferential edge. Accordingly, the two drive devices can be arranged efficiently with a small spacing on the base plate thereby to reduce the size of the device. Especially when the first light quantity adjusting blades are formed of the shutter blades and the first drive device is formed of the magnet rotor arranged rotatably around the exposure aperture and the ring-shaped exciting coil, the drive portion can be made relatively large in the ring shape thereby to retain a sufficient output torque for opening/closing the blades at a high speed.

The second light quantity adjusting blade is formed of the iris blade, and the second drive device for the blade is arranged rotatably at a portion of the outer circumferential edge of the base plate. Even if the magnet rotor and the exciting coil are made small in size and diameter so that the iris blade is opened and closed with a low torque, the photographing function is not influenced to a large extent. Therefore, the device can be made small and compact.

When one of the first and second drive devices is arranged on the base plate in the stacked state of the order of the magnet rotor and the exciting coil whereas the other is arranged in the stacked state of the order of the exciting coil and the magnet rotor, the magnet rotors neither adjoin to each other nor magnetically interfere with each other, so that stable drive rotations can be attained.

The disclosure of Japanese Patent Application No. 2004-199261, filed on Jul. 6, 2004, is incorporated in the application.

While the invention has been explained with reference to the specific embodiments of the invention, the explanation is illustrative and the invention is limited only by the appended claims.

What is claimed is:

1. A light quantity adjusting device, comprising:
   a base plate with a ring shape having an exposure aperture at a center thereof,
   a first light quantity adjusting blade arranged in the exposure aperture,
   a first drive device for opening and closing the first light quantity adjusting blade, said first drive device having a first magnet rotor with a ring shape, a first exciting coil with a ring shape, and a first guiding member for guiding a magnetic field generated in the first exciting coil to a position facing a magnetic pole formed on a circumference side of the first magnet rotor, said first magnet rotor and said first exciting coil being arranged on an inner circumferential edge of the exposure aperture in a stacked state,
   a second light quantity adjusting blade arranged in the exposure aperture, and
   a second drive device for opening and closing the second light quantity adjusting blade, said second drive device having a second magnet rotor, a second exciting coil, and a second guiding member for guiding a magnetic field generated in the second exciting coil to a position facing a magnetic pole formed on a circumference side of the second magnet rotor, said second magnet rotor and said second exciting coil being arranged on a portion of an outer circumferential edge of the exposure aperture.

2. A light quantity adjusting device according to claim 1, wherein said first guiding member includes an inner guiding member made of a soft magnetic material and facing an inner circumferential surface of the first magnet rotor, and an outer guiding member made of a soft magnetic material facing an outer circumferential surface of the first magnet rotor, said outer guiding member having a comb-tooth shape and being integrated with the inner guiding member.

3. A light quantity adjusting device according to claim 1, wherein said first light quantity adjusting blade includes shutter blades for opening and closing the exposure aperture, said second light quantity adjusting blade including an iris blade for adjusting a diameter of the exposure aperture, said first drive device being arranged to generate an output torque larger than that of the second drive device.

4. A light quantity adjusting device, comprising:
   a base plate with a ring shape having an exposure aperture at a center thereof, a first light quantity adjusting blade arranged in the exposure aperture, a first drive device for opening and closing the first light quantity adjusting blade, said first drive device having a first magnet rotor with a ring shape and a first exciting coil with a ring shape, a second light quantity adjusting blade arranged in the exposure aperture, and a second drive device for opening and closing the second light quantity adjusting blade, said second drive device having a second magnet rotor with a ring shape arranged on a portion of an outer circumferential edge of the exposure aperture and a second exciting coil with a ring shape having a diameter substantially equal to that of the second magnet rotor, one of said first drive device and said second drive device being arranged on the base plate in a stacked state in an order of the first or second magnet rotor and the exciting coil corresponding thereto, and the other of said first drive device and said second drive device being arranged on the base plate in a stacked state in an order of the first or second exciting coil and the magnet rotor corresponding thereto.

5. A light quantity adjusting device according to claim 4, wherein said first magnet rotor is arranged on an inner circumferential edge of the exposure aperture, and the first exciting coil has a diameter substantially equal to that of the first magnet rotor.

6. A light quantity adjusting device according to claim 5, wherein said first light quantity adjusting blade includes shutter blades for opening and closing the exposure aperture, said second light quantity adjusting blade including an iris blade for adjusting a diameter of the exposure aperture, said first drive device being arranged to generate an output torque larger than that of the second drive device.

7. A light quantity adjusting device according to claim 5, wherein at least one of said first drive device and said second drive device includes a plurality of different magnetic poles formed alternately on the circumferential side of at least one of the first magnet rotor and the second magnet rotor, and a guiding member for inducing a magnetic field generated in the first or second exciting coil to a position facing the magnetic poles.

8. A light quantity adjusting device according to claim 7, wherein said guiding member includes an inner guiding member made of a soft magnetic material facing an inner circumferential surface of the first or second magnet rotor, and a plurality of outer guiding members made of a soft magnetic material facing an outer circumferential surface of said first or second magnet rotor, said plurality of outer guiding members having a comb-tooth shape and being integrated with the inner guiding member.

9. A photographing device comprising the light quantity adjusting device according to claim 5, a focusing lens for focusing light coming from an object, and a photographing unit for receiving the light from the focusing lens, said base plate being arranged in an optical path from the object to the focusing lens.

* * * * *